(12) United States Patent
Bang et al.

(10) Patent No.: US 11,051,148 B2
(45) Date of Patent: Jun. 29, 2021

(54) USIM MANAGEMENT DEVICE AND INDUSTRIAL COMMUNICATION TERMINAL

(71) Applicant: UNIONPLACE CO., LTD., Seoul (KR)

(72) Inventors: Seongcheol Bang, Bucheon-si (KR); Jaewon Cha, Seoul (KR)

(73) Assignee: UNIONPLACE CO., LTD., Seoul (KR)

(*) Notice: Subject to any disclaimer, the term of this patent is extended or adjusted under 35 U.S.C. 154(b) by 0 days.

(21) Appl. No.: 17/087,455

(22) Filed: Nov. 2, 2020

(65) Prior Publication Data

US 2021/0051456 A1 Feb. 18, 2021

Related U.S. Application Data

(63) Continuation of application No. PCT/KR2019/007077, filed on Jun. 12, 2019.

(30) Foreign Application Priority Data

Jul. 4, 2018 (KR) .................. 10-2018-0077629

(51) Int. Cl.
*H04W 4/60* (2018.01)
*H04W 8/20* (2009.01)
*H04W 8/24* (2009.01)

(52) U.S. Cl.
CPC .............. *H04W 4/60* (2018.02); *H04W 8/20* (2013.01); *H04W 8/24* (2013.01)

(58) Field of Classification Search
CPC ............ H04W 4/60; H04W 8/20; H04W 8/24
See application file for complete search history.

(56) References Cited

U.S. PATENT DOCUMENTS

| 2012/0029947 A1* | 2/2012 | Wooldridge ........... G06Q 50/22 705/4 |
| 2012/0108294 A1 | 5/2012 | Kaul ............................ 455/558 |

(Continued)

FOREIGN PATENT DOCUMENTS

| KR | 10-0876434 B1 | 12/2008 |
| KR | 10-2014-0037012 A | 3/2014 |

(Continued)

OTHER PUBLICATIONS

International Search Report dated Sep. 18, 2019, issued to International Application No. PCT/KR2019/007077.

(Continued)

*Primary Examiner* — Barry W Taylor
(74) *Attorney, Agent, or Firm* — Stein IP, LLC

(57) ABSTRACT

A universal subscriber identity module (USIM) management device includes a communication interface, a storage configured to store an issue date indicating a date on which a USIM is installed into an industrial communication terminal, and an operation processor. The operation processor is configured to execute: (a) receiving the issue date from at least one among the industrial communication terminal and a subscriber management system in a mobile communication network to which the industrial communication terminal is connected, and storing the received issue date in the storage; (b) receiving USIM usage information from the industrial communication terminal through the communication interface; and (c) determining whether to replace the USIM based on the issue date and the USIM usage information.

10 Claims, 6 Drawing Sheets

(56) References Cited

U.S. PATENT DOCUMENTS

2012/0300938 A1* 11/2012 Kean ................ G06Q 40/00
380/279
2019/0146861 A1* 5/2019 Joshi ................ H04L 41/0672
714/37

FOREIGN PATENT DOCUMENTS

| KR | 10-1425598 B1 | 8/2014 |
| KR | 10-1505040 B1 | 3/2015 |
| KR | 10-2016-0123738 A | 10/2016 |

OTHER PUBLICATIONS

Korean Office Action dated Sep. 10, 2018, issued to Korean Application No. 10-2018-0077629.

* cited by examiner

FIG. 4

| COUNTRY CODE | PROVIDER CODE | TERMINAL CODE |
|---|---|---|
| 8982 | 12 | 1234657 |
| FIRST SERIAL NUMBER | | SECOND SERIAL NUMBER |
| 2585644 | | XXXXXX |

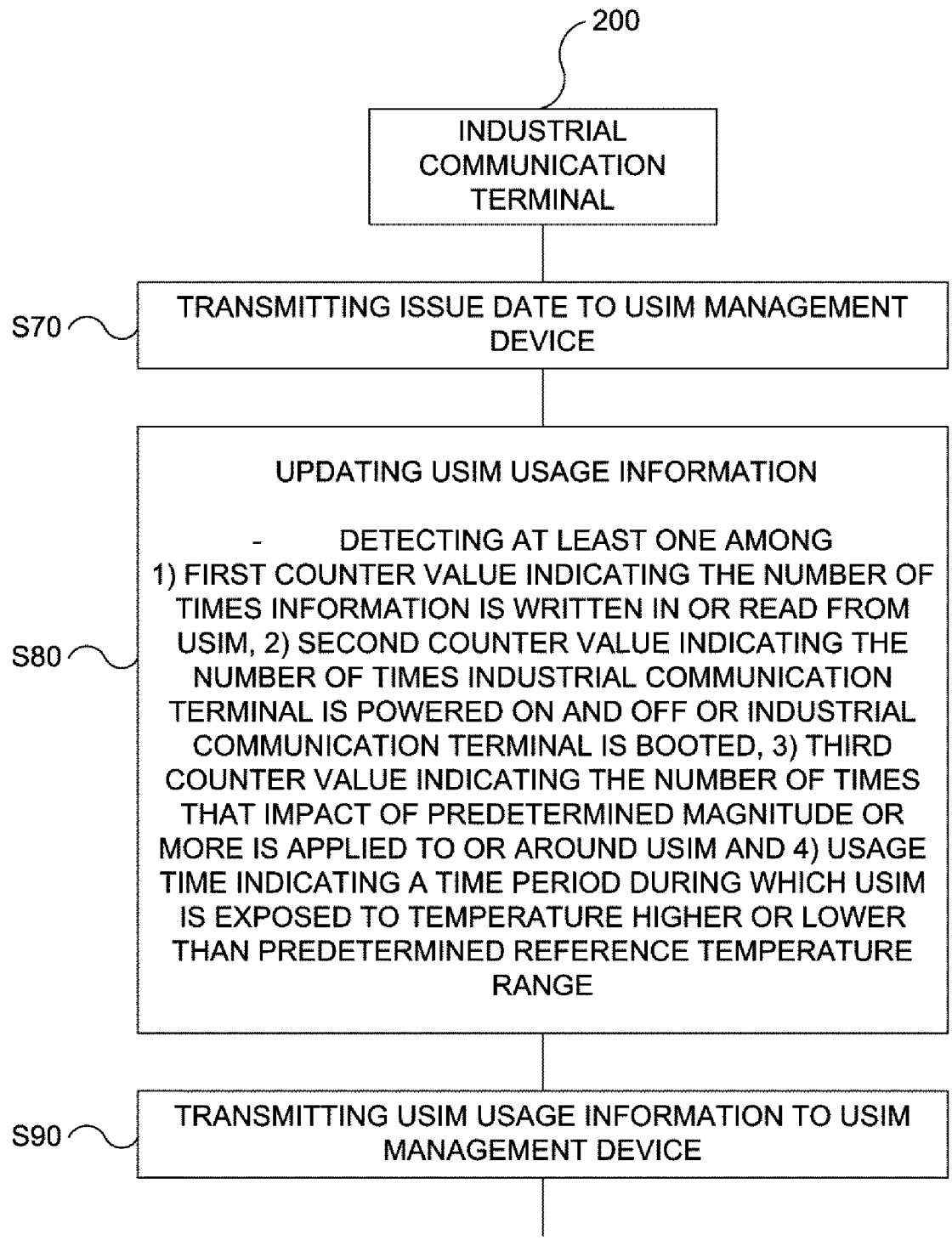

USIM MANAGEMENT DEVICE AND INDUSTRIAL COMMUNICATION TERMINAL

CROSS-REFERENCE TO RELATED PATENT APPLICATION

This is a continuation application of International Application No. PCT/KR2019/007077, filed on Jun. 12, 2019, in the WIPO, and claims the benefit of Korean Patent Application No. 10-2018-0077629, filed on Jul. 4, 2018, in the Korean Intellectual Property Office, the entire contents of which are hereby incorporated by reference.

BACKGROUND

1. Field

The present disclosure relates to a universal subscriber identity module (USIM) management device and an industrial communication terminal, and more particularly, a USIM management device for determining whether to replace a USIM installed into an industrial communication terminal based on USIM usage information and the industrial communication terminal for generating the USIM usage information and transmitting the USIM usage information to the USIM management device.

The technique of the present disclosure was developed with the support of the research project of the ministry of small and medium enterprises and startups, which is managed by Korea technology and information promotion agency (project title: "LTE-X network-based UICC semiconductor state management and development of management platform for securing operation safety of industrial equipment," project number: S2845123).

2. Description of the Related Art

A user authentication device such as universal subscriber identity module (USIM) is a device that stores subscriber identification information of a portable communication terminal while implementing the security function to protect the USIM against cloning. The USIM is used by being inserted into, e.g., the portable communication terminal, and an integrated circuit (IC) card is used as the USIM, for example. The USIM may be further used to store, in addition to subscriber identification information, information such as telephone numbers, text messages and credit card information. For example, when the portable communication terminal is powered on or when mobile communication is performed with another terminal through a mobile communication network, the portable communication terminal reads the subscriber identification information of the USIM. When the USIM does not operate normally or is damaged, in general, a user of the portable communication terminal visits an agency of a mobile service provider and replaces an existing USIM with a new USIM.

Recently, USIM is employed not only for mobile communication between individuals, but also for communication between industrial devices. For example, the USIM is installed in various devices such as a plurality of communication devices installed in transportation means such as automobiles, buses, trains, and ships, a plurality of communication devices installed in industrial sites, and a plurality of communication devices installed in drones. For example, Korean Patent Application Publication No. 10-2014-0037012 (hereinafter referred to as Patent Document 1) entitled "Infrastructure equipment and communication Method" filed by SCA IPLA Holdings Inc. and published on Mar. 26, 2014 discloses infrastructure equipment including communication devices. Infrastructure equipment is connected to the mobile communication network using USIM.

In the following description, a plurality of communication devices installed in transportation means such as automobiles, buses, trains, and ships, a plurality of communication devices installed in industrial sites, and a plurality of communication devices respectively installed in delivery drones are referred to as "industrial communication terminal."

The industrial communication terminal may include other devices in addition to the communication devices installed in transportation means such as automobiles, buses, trains, and ships, the communication devices installed in industrial sites, and the communication devices respectively installed in delivery drones. For example, the industrial communication terminal may include a communication device provided in a sensor network for remote detection or a communication device provided in a wearable device. The industrial communication terminal may transmit and receive data through a mobile communication network such as a national disaster safety communication network (PS-LTE), an integrated railway network using (LTE-R), and a maritime network (LTE-M).

Meanwhile, the life span of USIM is determined according to an environment where the USIM is utilized or the number of times that information is written into or read from the USIM. For example, if the number of times that information is written into or read from the USIM exceeds a predetermined number of times, the possibility that the USIM will not operate normally becomes higher. Further, if the USIM is used for a long period of time at a higher or lower temperature than a predetermined temperature or if an impact is applied to the USIM, the possibility of the USIM being damaged increases. When the USIM does not operate normally or is damaged, the operation of the industrial communication terminal using the USIM is also not normally performed. In particular, if the USIM inserted in the industrial communication terminal does not operate normally even when the industrial communication terminal operates normally, there may be problems that the industrial communication terminal is not able to communicate with other devices, an error occurs when booting the industrial communication terminal, an application executed in the industrial communication terminal does not operate normally, or an industrial communication terminal stops working. In those situations, it is often difficult to detect which one of the industrial communication terminal and the USIM has a failure. Thus, it is necessary to replace the industrial communication terminal as a whole even when the industrial communication terminal operates normally.

In addition, when the industrial communication terminal is installed on a train, a plurality of industrial communication terminals are installed in correspondence with each carriage of the train or components installed in each carriage of the train. Therefore, the environments where the plurality of industrial communication terminals are utilized may be different from each other. In this circumstance, for example, the maintenance of the USIM installed in each of the industrial communication terminals can be performed by replacing all the USIMs respectively installed in the industrial communication terminals at regular time intervals. For example, all the USIMs respectively installed in the industrial communication terminals are replaced every two years. However, in this case, the USIMs installed in the normally operating industrial communication terminals also need to be collectively replaced. Therefore, it is disadvantageous in that the cost for maintenance of the USIMs increases significantly.

RELATED ART

Patent Document 1: Korean Patent Application Publication No. 10-2014-0037012

SUMMARY

In view of the above, the present disclosure provides a USIM management device that determines whether to replace a USIM installed into an industrial communication terminal based on USIM usage information.

The present disclosure further provides the industrial communication terminal that generates the USIM usage information and transmits the USIM usage information to the USIM management device. The USIM usage information may include information indicating the number of times the USIM is utilized or an environment where the USIM is utilized.

In accordance with an aspect of the present disclosure, there is provided a universal subscriber identity module (USIM) management device including: a communication interface; a storage configured to store an issue date indicating a date on which a USIM is installed into an industrial communication terminal; and an operation processor configured to execute: (a) receiving the issue date from at least one among the industrial communication terminal and a subscriber management system in a mobile communication network to which the industrial communication terminal is connected, and storing the received issue date in the storage; (b) receiving USIM usage information from the industrial communication terminal through the communication interface; and (c) determining whether to replace the USIM based on the issue date and the USIM usage information.

Further, in accordance with another aspect of the present disclosure, there is provided an industrial communication terminal including: a communication interface; a storage configured to store USIM usage information; and an operation processor configured to execute (a) transmitting an issue date, which indicates a date on which the USIM is installed, to a predetermined USIM management device through the communication interface; (b) updating the USIM usage information; and (c) transmitting the USIM usage information to the predetermined USIM management device wherein, (b) includes updating the USIM usage information by detecting at least one among: a first counter value indicating the number of times information is written in or read from the USIM; a second counter value indicating the number of times the industrial communication terminal is powered on and off or the industrial communication terminal is booted; a third counter value indicating the number of times that an impact of a predetermined magnitude or more is applied to or around the USIM; and a usage time indicating a time period during which the USIM is exposed to a temperature higher or lower than a predetermined reference temperature range.

BRIEF DESCRIPTION OF THE DRAWINGS

FIG. 4 is a diagram showing an example of USIM information maintained in a subscriber management system.

FIG. 7 is a diagram showing an example of processes executed by the operation processor of the industrial communication terminal according to the embodiment of the present disclosure.

DETAILED DESCRIPTION

Figure 1:
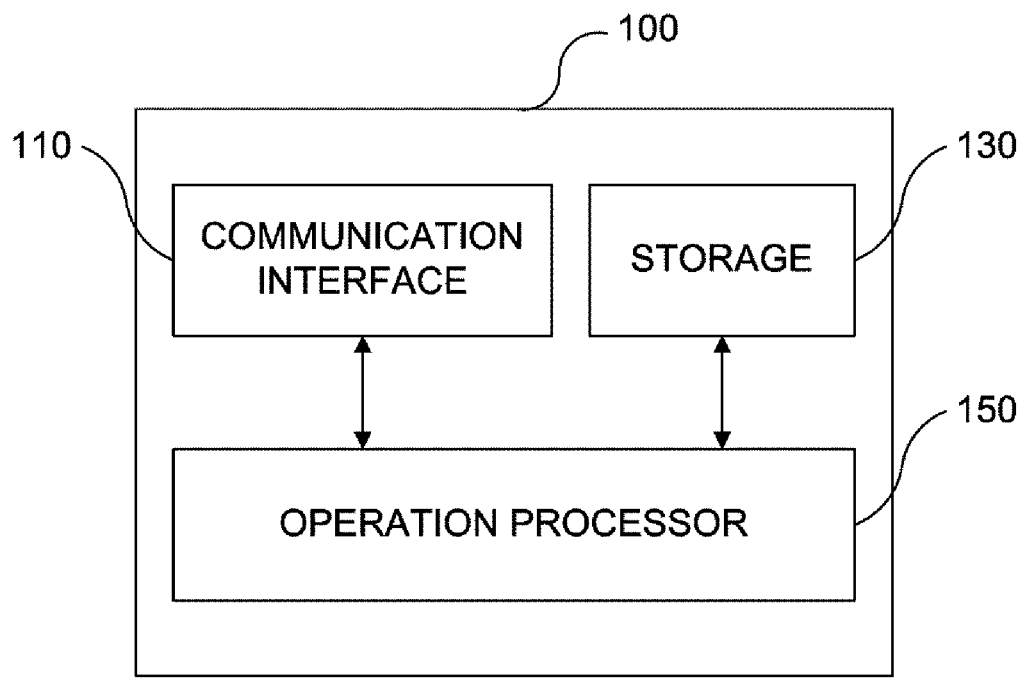
FIG. 1 is a block diagram showing an exemplary configuration of a USIM management device according to an embodiment of the present disclosure.

Hereinafter, embodiments of a Universal subscriber identity module (USIM) management device and an industrial communication terminal according to the techniques described in the present disclosure will be described in detail with reference to the accompanying drawings. Meanwhile, in the drawings for describing the embodiments of the techniques of the present disclosure, only a part of the practical configurations may be illustrated, a part of the practical configurations may be omitted or changed, and relative dimensions and proportions of parts therein may be exaggerated or reduced in size for the sake of convenience of description.

<USIM Management Device>

FIG. 1 is a block diagram showing an exemplary configuration of a USIM management device according to an embodiment of the present disclosure.

Referring to FIG. 1, a USIM management device 100 according to the embodiment of the present disclosure includes a communication interface 110, a storage 130, and an operation processor 150.

The communication interface 110 is an interface that is configured to communicate with an industrial communication terminal 200 to be described later, a subscriber management system 400, and a predetermined administrator terminal 500. The communication interface 110 may be implemented by, for example, a semiconductor device such as a communication chip.

The storage 130 is configured to store an issue date. The issue date indicates the date on which a USIM 300 is installed into the industrial communication terminal 200. The storage 130 may be implemented by, for example, a semiconductor device such as a semiconductor memory.

The operation processor 150 will be described later.

The USIM management device 100 according to the embodiment of the present disclosure may be implemented by using, for example, a computing device such as a personal computer and a dedicated computer.

Figure 2:
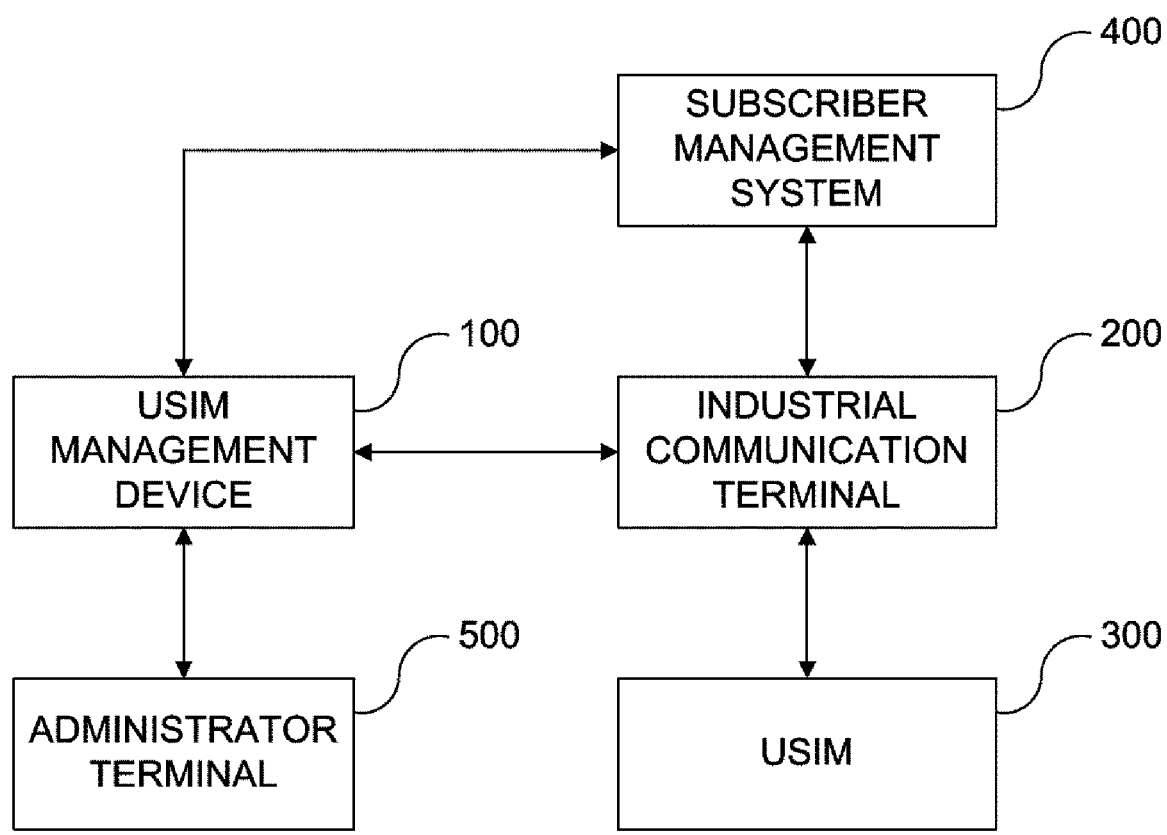
FIG. 2 is a diagram showing a system environment where the USIM management device is utilized according to the embodiment of the present disclosure.

FIG. 2 is a diagram showing a system environment where the USIM management device is utilized according to the embodiment of the present disclosure.

Referring to FIG. 2, the system environment where the USIM management device is utilized includes the USIM management device 100, the industrial communication terminal 200, the USIM 300, the subscriber management system 400 and the predetermined administrator terminal 500.

A detailed description of the USIM management device 100, in particular, a detailed description of the operation processor 150 of the USIM management device 100 will be described later. In FIG. 2, although a case where the USIM management device 100 is connected to one industrial communication terminal 200 through a mobile communication network is illustrated as an example, the USIM management device 100 may be connected to a plurality of industrial communication terminals, for example, 1,000 industrial communication terminals through the mobile communication network.

As described above, the industrial communication terminal 200 may include a plurality of communication devices installed in transportation means such as automobiles, buses, trains, and ships, a plurality of communication devices installed in industrial sites, a plurality of communication devices installed in delivery drones, a communication device provided in a sensor network for remote detection, and a communication device provided in a wearable device.

The industrial communication terminal 200 may transmit and receive data to and from the USIM management device 100 or the subscriber management system 400 through a mobile communication network such as long term evolution (LTE), public safety long term evolution (PS-LTE), long term evolution for railway (LTE-R), and long term evolution for machine (LTE-M).

The USIM 300 is configured to store subscriber identification information of the industrial communication terminal 200 and is installed into the industrial communication terminal 200. The USIM 300 may transmit and receive data to and from the industrial communication terminal 200 through a standard such as the ISO 7816 interface.

The subscriber management system 400 is a system managed by a mobile service provider that operates a mobile communication network and performs subscriber management.

The administrator terminal 500 is, for example, a mobile communication terminal or a computing device, and is a terminal used by an administrator in charge of replacing or managing the industrial communication terminal 200, in particular, the USIM 300. The administrator terminal 500 may transmit and receive data to and from the USIM management device 100 through a mobile communication network such as LTE.

Hereinafter, the USIM management device according to the embodiment of the present disclosure will be described in more detail with reference to FIGS. 1 and 2.

Figure 3:
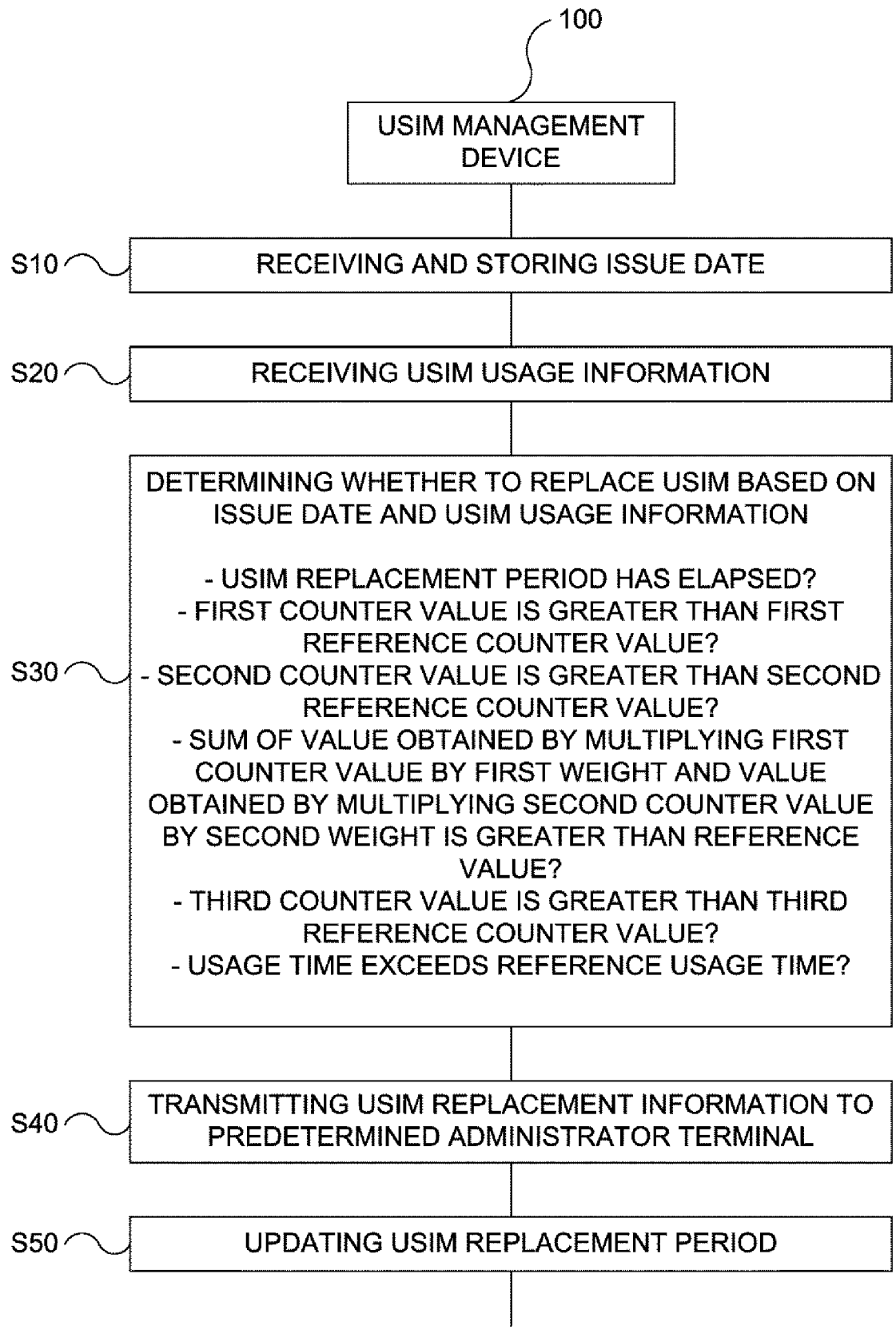
FIG. 3 is a diagram showing an example of processes executed by an operation processor of the USIM management device according to the embodiment of the present disclosure.

FIG. 3 is a diagram showing an example of processes executed by the operation processor of the USIM management device according to the embodiment of the present disclosure.

The operation processor 150 may be implemented by, for example, a semiconductor device such as a central processing unit (CPU).

The operation processor 150 executes a process S10 of receiving the issue date indicating the date on which the USIM 300 is installed into the industrial communication terminal 200 through a communication interface 110 from at least one among the industrial communication terminal 200 and the subscriber management system 400 in the mobile communication network to which the industrial communication terminal 200 is connected, and storing the issue date in the storage 130.

For example, the USIM management device 100 may directly receive and store the issue date from the industrial communication terminal 200. Alternatively, the USIM management device 100 may receive and store the issue date from the subscriber management system 400.

FIG. 4 is a diagram showing an example of USIM information maintained in the subscriber management system.

When the USIM 300 is installed into the industrial communication terminal 200, the subscriber management system 400 maintains information of the USIM 300. The information of the USIM 300 may be different for each mobile service provider, but may contain, for example, a country code, a provider code, a terminal code, and a first serial number and a second serial number. Further, the subscriber management system 400 stores the date on which the USIM 300 is issued to the industrial communication terminal 200.

The subscriber management system 400 transmits the issue date of the USIM 300 installed into the industrial communication terminal 200 to the USIM management device 100 based on the information of the USIM 300. Specifically, when the terminal code or the first serial number corresponds to a predetermined value, the subscriber management system 400 transmits the issue date of the USIM 300 installed into the industrial communication terminal 200 to the USIM management device 100. In such a manner, the USIM management device 100 can receive and store the issue date from the subscriber management system 400.

Next, the operation processor 150 executes a process S20 of receiving USIM usage information through the communication interface 110 from the industrial communication terminal 200. The USIM usage information may include information indicating the number of times the USIM 300 is utilized or an environment where the USIM 300 is utilized. Herein, the environment may involve, for example, a temperature around the USIM 300 or an impact applied onto the USIM 300. The USIM usage information will be described in more detail through the description of a process S30.

Then, the operation processor 150 executes a process S30 of determining whether to replace the USIM 300 installed into the industrial communication terminal 200 based on the issue date received and stored through the process S10 and the USIM usage information received through the process S20.

Hereinafter, the process S30 will be described in more detail.

Referring to FIG. 3, the process S30 may include a process of determining that the USIM 300 is to be replaced when a USIM replacement period has elapsed from the issue date received and stored through the process S10.

The USIM replacement period may be set in advance by the manufacturer of the USIM 300 or by an operator managing the industrial communication terminal 200, for example, an administrator of the industrial communication terminal 200.

Alternatively, as will be described through a process S50 to be described later, the USIM replacement period may be updated to be more suitable for the industrial communication terminal 200 even after it is set in advance.

The replacement of the USIM 300 installed into the industrial communication terminal 200 may be determined based on, for example, the number of times the industrial communication terminal 200 writes or reads information into or from the USIM 300.

That is, the USIM usage information received through the process S20 may include a first counter value indicating the number of times the industrial communication terminal 200 writes or reads information into or from the USIM 300.

Referring to FIG. 3, the process S30 may include a process of determining that the USIM 300 is to be replaced if the first counter value is greater than a first reference counter value.

The first reference counter value may be set in advance by, for example, the manufacturer of the USIM 300, an operator managing the industrial communication terminal 200 such as the administrator of the industrial communication terminal 200, or the USIM management device 100.

For example, when the USIM management device 100 is connected to a plurality of industrial communication terminals to manage the plurality of industrial communication terminals, the USIM management device 100 extracts the number of times that a reference industrial communication terminal (not shown), which is equipped with the same type of USIM as the USIM 300 among the plurality of industrial communication terminals, writes or reads information into or from the USIM until the reference industrial communication terminal operates abnormally and, then, the USIM management device 100 sets the extracted number of times as the first reference counter value.

Alternatively, the USIM management device 100 extracts the number of times each of a plurality of reference industrial communication terminals, which are equipped with the same type of USIM as the USIM 300 among the plurality of industrial communication terminals, writes or reads information into or from the USIM until the respective reference industrial communication terminals operates abnormally and, then, the USIM management device 100 sets an average of the extracted number of times for the respective reference industrial communication terminals as the first reference counter value. In such a manner, the first reference counter value may be more appropriately set (updated) for the industrial communication terminal 200 even after it is set in advance by the manufacturer of the USIM 300.

Figure 5:
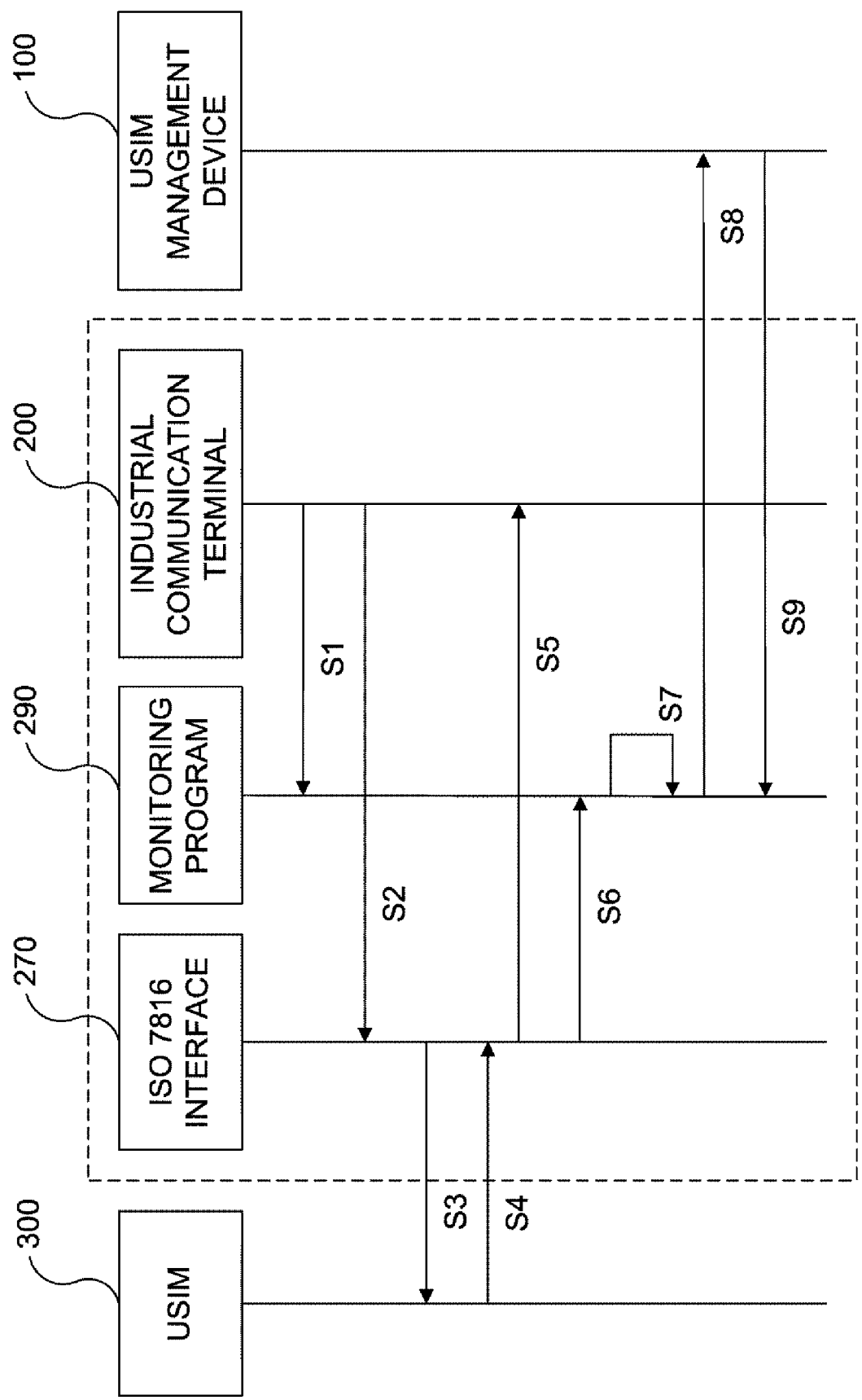
FIG. 5 is a diagram for explaining a process of extracting a first counter value indicating the number of times that an industrial communication terminal writes or reads information into or from a USIM.

FIG. 5 is a diagram for explaining a process of extracting the first counter value indicating the number of times that the industrial communication terminal writes or reads information into or from the USIM.

Referring to FIG. 5, a monitoring program 290 is executed in the industrial communication terminal 200. In addition, the industrial communication terminal 200 has an ISO 7816 interface 270 and transmits and receives data to and from the USIM 300 through the ISO 7816 interface 270.

First, the industrial communication terminal 200, more specifically, an application or a management program such as an operating system executed in the industrial communication terminal 200, executes the monitoring program 290 (S1). The monitoring program 290 is used to extract the first counter value and may be further used to extract at least one among a second counter value, a third counter value, and a usage time to be described later.

Next, the industrial communication terminal 200, more specifically, the management program or the application executed in the industrial communication terminal 200 transmits a request for writing information to the USIM 300 or reading information from the USIM 300 to the ISO 7816 interface 270 (S2). Then, the ISO 7816 interface 270 transmits the request to the USIM 300 (S3) and receives a response to the request from the USIM 300 (S4). The ISO 7816 interface 270 transmits the response to the industrial communication terminal 200, more specifically, to the management program or the application executed in the industrial communication terminal 200 (S5) and also transmits the response to the monitoring program 290 (S6). Upon receiving the response, the monitoring program 290 determines whether the response is about information writing or information reading with respect to the USIM 300 and updates the first counter value (S7). The first counter value is initially set to 0 and is incremented whenever information is written in the USIM 300 or information is read from the USIM 300. Thereafter, the monitoring program 290 transmits the first counter value to the USIM management device 100 (S8). Then, the monitoring program 290 may receive information that the first counter value exceeds the first reference number from the USIM management device 100, for example (S9).

As the number of times the industrial communication terminal 200 writes or read information to and from the USIM 300 increases, the possibility of malfunctioning or damage of the industrial communication terminal 200 or the USIM 300 increases. Accordingly, the operation processor 150 determines that the USIM 300 is to be replaced if the first counter value is greater than the first reference counter value through the process S30.

The replacement of the USIM 300 installed into the industrial communication terminal 200 is determined based on, for example, the number of times the industrial communication terminal 200 is powered on and off or the industrial communication terminal 200 is booted.

That is, the USIM usage information received through the process S20 may include the second counter value indicating the number of times the industrial communication terminal 200 is powered on and off or the industrial communication terminal 200 is booted.

Referring to FIG. 3, the process S30 may include a process of determining that the USIM 300 is to be replaced if the second counter value is greater than a second reference counter value.

When the industrial communication terminal 200 is frequently powered on and off or the industrial communication terminal 200 is frequently booted, the number of times the industrial communication terminal 200 reads information from the USIM 300 increases. Accordingly, the possibility of malfunctioning or damage of the industrial communication terminal 200 or the USIM 300 increases as the industrial communication terminal 200 is frequently powered on and off or the industrial communication terminal 200 is frequently booted. Therefore, the operation processor 150 determines the replacement of the USIM 300 if the second counter value is greater than the second reference counter value through the process S30.

The second reference counter value may be set in advance by, for example, the manufacturer of the USIM 300, an operator managing the industrial communication terminal 200 such as the administrator of the industrial communication terminal 200, or the USIM management device 100.

For example, when the USIM management device 100 is connected to the plurality of industrial communication terminals to manage the plurality of industrial communication terminals, the USIM management device 100 extracts the number of times that the reference industrial communication terminal (not shown), which is equipped with the same type of USIM as the USIM 300 among the plurality of industrial communication terminals, is powered on and off or the number of times the reference industrial communication terminal is booted until the reference industrial communication terminal operates abnormally and, then, the USIM management device 100 sets the extracted number of times as the second reference counter value.

Alternatively, the USIM management device 100 extracts the number of on/off times or the number of booting times for each of the plurality of reference industrial communication terminals, which are equipped with the same type of USIM as the USIM 300 among the plurality of industrial communication terminals, until the respective reference industrial communication terminals operates abnormally and, then, the USIM management device 100 sets an average of the extracted number of on/off times or the extracted number of booting times for the respective reference industrial communication terminals as the second reference counter value. In such a manner, the second reference counter value may be more appropriately set (updated) for the industrial communication terminal 200 even after it is set in advance by the manufacturer of the USIM 300.

A process of extracting the second counter value for the industrial communication terminal 200 is similar to the process of extracting the first counter value indicating the number of times the industrial communication terminal 200 writes or reads information into or from the USIM 300 that is shown in FIG. 5. However, in the process of extracting the second counter value, the monitoring program 290 confirms the industrial communication terminal 200 is powered on and off or the industrial communication terminal 200 is booted through an application or a management program such as an operating system executed in the industrial communication terminal 200 and updates the second counter value. The second counter value is initially set to 0 and is incremented whenever the industrial communication terminal 200 is powered on and off or the industrial communication terminal 200 is booted. Thereafter, the monitoring program 290 transmits the second counter value to the USIM management device 100.

Meanwhile, the replacement of the USIM 300 installed into the industrial communication terminal 200 may be determined based on, for example, both of the first counter value and the second counter value described above.

Referring to FIG. 3, the process S30 may include a process of determining that the USIM 300 is to be replaced if the sum of a value obtained by multiplying the first counter value by a first weight and a value obtained by multiplying the second counter value by a second weight is greater than a reference value.

The first weight and the second weight may be appropriately determined. For example, when the first counter value (that is, the number of times the industrial communication terminal 200 writes or reads information to and from the USIM 300) has more influence on the abnormal operation or the damage of the USIM 300 compared to the second counter value (that is, the number of times the industrial communication terminal 200 is powered on and off or the number of times the industrial communication terminal 200 is booted), the first weight is set to be greater than the second weight.

Meanwhile, the replacement of the USIM 300 installed into the industrial communication terminal 200 may be determined based on, for example, the number of times that an impact of a predetermined magnitude or more is applied to or around the USIM 300.

That is, the USIM usage information received through the process S20 may include a third counter value indicating the number of times that the impact of the predetermined magnitude or more is applied to or around the USIM 300, which is detected by the industrial communication terminal 200. For example, the industrial communication terminal 200 may include an impact sensor (not shown) to extract the counter value indicating the number of times that the impact of the predetermined magnitude or more is applied to or around the USIM 300. That is, as the information indicating the environment where the USIM 300 is utilized, the third counter value may be used.

Referring to FIG. 3, the process S30 may include a process of determining that the USIM 300 is to be replaced if the third counter value is greater than a third reference counter value.

The third reference counter value may be set by the administrator of the industrial communication terminal 200 or the USIM management device 100.

For example, when the USIM management device 100 is connected to the plurality of industrial communication terminals to manage the plurality of industrial communication terminals, the USIM management device 100 extracts the number of times that an impact of a predetermined magnitude or more is applied to or around an USIM installed into the reference industrial communication terminal, which is equipped with the same type of USIM as the USIM 300 among the plurality of industrial communication terminals, until the reference industrial communication terminal operates abnormally and, then, the USIM management device 100 sets the extracted number of times as the third reference counter value.

Alternatively, the USIM management device 100 extracts the number of impact times for an USIM installed into each of the plurality of reference industrial communication terminals, which are equipped with the same type of USIM as the USIM 300 among the plurality of industrial communication terminals, until the respective reference industrial communication terminal operates abnormally and, then, the USIM management device 100 sets an average of the extracted number of impact times for the respective reference industrial communication terminals as the third reference counter value. In such a manner, the third reference counter value may be more appropriately set (updated) for the industrial communication terminal 200.

A process of extracting the third counter value for the industrial communication terminal 200 is similar to the process of extracting the first counter value indicating the number of times the industrial communication terminal 200 writes or reads information into or from the USIM 300 that is shown in FIG. 5. However, in the process of extracting the third counter value, the monitoring program 290 updates the third counter value indicating the number of times that the impact of the predetermined magnitude or more is applied to or around the industrial communication terminal 200, in particular, the USIM 300 installed therein through an application or a management program such as an operating system executed in the industrial communication terminal 200. The third counter value is initially set to 0 and is incremented whenever the impact of the predetermined magnitude or more is applied to or around the industrial communication terminal 200, in particular, the USIM 300. Thereafter, the monitoring program 290 transmits the third counter value to the USIM management device 100.

Meanwhile, the replacement of the USIM 300 installed into the industrial communication terminal 200 may be determined based on, for example, a usage time (exposure time) indicating a time period during which the USIM 300 is exposed to a temperature higher or lower than the reference temperature range. That is, as the information indicating the environment where the USIM 300 is utilized, the usage time may be used.

That is, the USIM usage information received through the process S20 may include a usage time indicating the time period during which the USIM 300 is exposed to the temperature higher or lower than the reference temperature range, which is detected by the industrial communication terminal 200. For example, the industrial communication terminal 200 may include a temperature sensor (not shown) to extract the usage time indicating the time period during which the USIM 300 is exposed to the temperature higher or lower than the reference temperature range.

Referring to FIG. 3, the process S30 may include a process of determining that the USIM 300 is to be replaced if the usage time exceeds a reference usage time.

The reference usage time may be set in advance by the manufacturer of the USIM 300, an operator managing the industrial communication terminal 200 such as the administrator of the industrial communication terminal 200, or the USIM management device 100.

For example, when the USIM management device 100 is connected to the plurality of industrial communication terminals to manage the plurality of industrial communication terminals, the USIM management device 100 extracts an exposure time period during which an USIM installed into the reference industrial communication terminal, which is equipped with the same type of USIM as the USIM 300 among the plurality of industrial communication terminals, is exposed to a temperature higher or lower than a reference temperature range until the reference industrial communication terminal operates abnormally and, then, the USIM management device 100 sets the extracted time period as the reference usage time.

Alternatively, the USIM management device 100 extracts the exposure time period for an USIM installed into each of the plurality of reference industrial communication terminals, which are equipped with the same type of USIM as the USIM 300 among the plurality of industrial communication terminals, until the respective reference industrial communication terminals operates abnormally and, then, the USIM management device 100 sets an average of the extracted exposure time period for the respective reference industrial communication terminals as the reference usage time. In such a manner, the reference usage time may be more appropriately set (updated) for the industrial communication terminal 200.

A process of extracting the usage time for the industrial communication terminal 200 is similar to the process of extracting the first counter value indicating the number of times the industrial communication terminal 200 writes or reads information into or from the USIM 300 that is shown in FIG. 5. However, in the process of extracting the usage time, the monitoring program 290 updates the usage time indicating the time period during which the industrial communication terminal 200, in particular, the USIM 300 is exposed to the temperature higher or lower than the reference temperature range through an application or a management program such as an operating system executed in the industrial communication terminal 200. The usage time is initially set to 0 and is incremented whenever the industrial communication terminal 200, in particular, the USIM 300 is exposed to the temperature higher or lower than the reference temperature range. Thereafter, the monitoring program 290 transmits the usage time to the USIM management device 100.

Referring back to FIG. 3, the operation processor 150 may further execute a process S40. Specifically, when it is determined that the USIM 300 is to be replaced in the process S30, the operation processor 150 further executes the process S40 of transmitting the identification information of the industrial communication terminal 200 and the USIM replacement information indicating a request for the replacement of the USIM 300 to the administrator terminal 500.

Referring back to FIG. 3, the operation processor 150 may further execute a process S50. Specifically, when it is determined that the USIM 300 is to be replaced in the process S30, the operation processor 150 updates the USIM replacement period (cycle) by comparing a time period elapsed from the issue date received and stored through the process S10 with a predetermined USIM replacement period. For example, even if the USIM replacement period is previously set to 2 years, the operation processor 150 may determines the replacement of the USIM 300 in the process S30 at a time period, for example, one and a half years passed from the issue date before the previously set USIM replacement period. In the above case, the USIM replacement period is updated to one and a half years through the process S50, so that the operation processor 150 may specify the USIM replacement period more suitable for the industrial communication terminal 200.

As described above, according to the embodiments of the present disclosure, it is possible to easily determine whether to replace the USIM based on the USIM usage information. Especially, in the case of maintenance of a large number of industrial communication terminals, it is possible to minimize the cost caused due to the batch replacement of USIMs. In addition, by appropriately replacing the USIM before the USIM installed in the industrial communication terminal operates abnormally or is damaged, it is possible to minimize the possibility that the industrial communication terminal does not operate normally due to the abnormal operation or the damage of the USIM.

<USIM Management Method>

According to an aspect of the present disclosure, there is provided a USIM management method including: (a) receiving the issue date, on which a USIM is installed into an industrial communication terminal, from at least one among the industrial communication terminal and a subscriber management system in a mobile communication network to which the industrial communication terminal is connected, and storing the received issue date in the storage; (b) receiving USIM usage information, which indicates at least one among a result caused by using the USIM and an environment where the USIM is utilized, from the industrial communication terminal through the communication interface, and (c) determining whether to replace the USIM based on the issue date and the USIM usage information.

The above described processes (a), (b), and (c) of the USIM management method according to the aspect of the present disclosure are substantially the same as the respective processes S10, S20 and S30 executed by the operation processor 150 of the USIM management device 100. Thus, detailed descriptions thereof will be omitted.

Further, the USIM management method according to the aspect of the present disclosure may further includes (d) transmitting, if it is determined that the USIM is to be replaced in the process (c), identification information of the industrial communication terminal and USIM replacement information indicating a request for the replacement of the USIM to a predetermined administrator terminal. In addition, the USIM management method according to the aspect of the present disclosure may further includes (e) updating, if it is determined that the USIM is to be replaced in the process (c), a USIM replacement period by comparing a time period elapsed from the issue date with the USIM replacement period. The above described processes (d) and (e) of the USIM management method according to the aspect of the present disclosure are substantially the same as the respective processes S40 and S50 executed by the operation processor 150 of the USIM management device 100. Thus, detailed descriptions thereof will be omitted.

<Industrial Communication Terminal>

Figure 6:
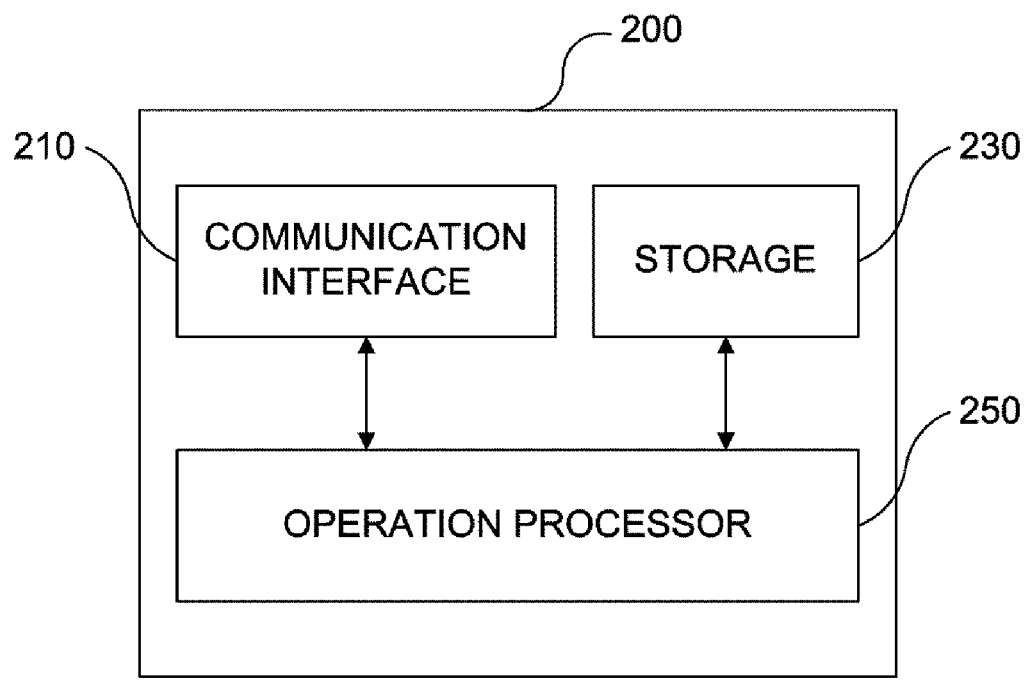
FIG. 6 is a block diagram showing an exemplary configuration of the industrial communication terminal according to the embodiment of the present disclosure.

FIG. 6 is a block diagram showing an exemplary configuration of the industrial communication terminal according to the embodiment of the present disclosure.

Referring to FIG. 6, the industrial communication terminal 200 according to the embodiment of the present disclosure includes a communication interface 210, a storage 230, and an operation processor 250.

The communication interface 210 is configured to perform communications with the USIM management device 100. The communication interface 210 may be further configured to perform communications with the subscriber management system 400 and the predetermined administrator terminal 500.

The storage 230 is configured to store the USIM usage information. The USIM usage information includes the date on which the USIM 300 is installed into the industrial communication terminal 200.

The operation processor 250 will be described later.

As described above, the industrial communication terminal 200 may include a plurality of communication devices installed in transportation means such as automobiles, buses, trains, and ships, a plurality of communication devices installed in industrial sites, a plurality of communication devices installed in delivery drones, a communication device provided in a sensor network for remote detection, and a communication device provided in a wearable device.

FIG. 7 is a diagram showing an example of processes executed by the operation processor of the industrial communication terminal according to the embodiment of the present disclosure.

Referring to FIG. 7, the operation processor 250 executes a process S70 of transmitting an issue date indicating the date on which the USIM 300 is installed into the industrial communication terminal 200 to the USIM management device 100 through the communication interface 210. As described above, the process S70 can be executed even in the case where the subscriber management system 400 in the mobile communication network to which the industrial communication terminal 200 is connected transmits the issue date to the USIM management device 100.

Then, the operation processor 250 executes a process S80 of updating the USIM usage information. That is, the operation processor 250 updates the USIM usage information stored in the storage 230 in response to according to the usage of the USIM 300.

More specifically, the operation processor 250 detect at least one among: a first counter value indicating the number of times the industrial communication terminal 200 writes or reads information into or from the USIM 300; a second counter value indicating the number of times the industrial communication terminal 200 is powered on and off or the industrial communication terminal 200 is booted; a third counter value indicating the number of times that an impact of a predetermined magnitude or more is applied to or around the USIM 300; and a usage time (exposure time) indicating a time period during which the USIM 300 is exposed to a temperature higher or lower than a predetermined reference temperature range. Then, the operation processor 250 updates the USIM usage information based on the detected result. Descriptions of the first counter value, the second counter value, the third counter value, and the usage time will be omitted since the descriptions thereof can be referred to the descriptions of the USIM management device.

Referring back to FIG. 7, the operation processor 250 further executes a process S90 of transmitting the updated USIM usage information in the process S80 to the USIM management device 100 through the communication interface 210.

As described above, according to the embodiment of the present disclosure, the industrial communication terminal may update the stored USIM usage information in response to the usage of the USIM and transmit the updated USIM usage information to the USIM management device.

<USIM Monitoring Method>

According to another aspect of the present disclosure, there is provided a USIM monitoring method including: (a) transmitting an issue date indicating a USIM installation date to a predetermined USIM management device; (b) updating USIM usage information; and (c) transmitting the USIM usage information to the USIM management device.

The above described processes (a), (b), and (c) of the USIM monitoring method according to another aspect of the present disclosure are substantially the same as the respective processes S70, S80 and S90 executed by the operation processor 150 of the industrial communication terminal 200, Thus, detailed descriptions thereof will be omitted.

Although various examples according to the embodiments of the present disclosure have been described in detail, the above descriptions merely illustrates the technical idea of the present disclosure, and it will be understood by those skilled in the art to which this present disclosure belongs that various changes and modifications may be made without departing from the scope of the essential characteristics of the present disclosure.

Accordingly, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

According to the embodiments of the present disclosure, it is possible to easily determine whether to replace the USIM based on the USIM usage information. The USIM usage information may include information indicating the number of times the USIM is utilized or an environment where the USIM is utilized. Especially, in the case of maintenance of a large number of industrial communication terminals, it is possible to minimize the cost caused due to the batch replacement of USIMs. In addition, by appropriately replacing the USIM before the USIM installed into the industrial communication terminal operates abnormally or is damaged, it is possible to minimize the possibility that the industrial communication terminal does not operate normally due to the abnormal operation or the damage of the USIM.

What is claimed is:

1. A universal subscriber identity module (USIM) management device comprising:
   a communication interface;
   a storage configured to store an issue date indicating a date on which a USIM is installed into an industrial communication terminal; and
   an operation processor configured to execute:

(a) receiving the issue date from at least one among the industrial communication terminal and a subscriber management system in a mobile communication network to which the industrial communication terminal is connected, and storing the received issue date in the storage;

(b) receiving USIM usage information from the industrial communication terminal through the communication interface; and (c) determining whether to replace the USIM based on the issue date and the USIM usage information.

2. The USIM management device of claim 1, wherein the operation processor is further configured to execute:

(d) transmitting identification information of the industrial communication terminal and USIM replacement information indicating a request for the replacement of the USIM to a predetermined administrator terminal when it is determined that the USIM is to be replaced in (c).

3. The USIM management device of claim 1, wherein the operation processor is further configured to execute:

(e) updating a USIM replacement period by comparing a time period elapsed from the issue date with the USIM replacement period when it is determined that the USIM is to be replaced in (c).

4. The USIM management device of claim 1, wherein (c) includes determining that the USIM is to be replaced when a USIM replacement period has elapsed from the issue date.

5. The USIM management device of claim 1, wherein the USIM usage information includes a first counter value indicating the number of times the industrial communication terminal writes or reads information into or from the USIM, and (c) includes determining that the USIM is to be replaced if the first counter value is greater than a first reference counter value.

6. The USIM management device of claim 1, wherein the USIM usage information includes a second counter value indicating the number of times the industrial communication terminal is powered on and off or the industrial communication terminal is booted, and (c) includes determining that the USIM is to be replaced if the second counter value is greater than a second reference counter value.

7. The USIM management device of claim 1, wherein the USIM usage information includes a first counter value indicating the number of times the industrial communication terminal writes or reads information into or from the USIM and a second counter value indicating the number of times the industrial communication terminal is powered on and off or the industrial communication terminal is booted, and (c) includes determining that the USIM is to be replaced if a sum of a value obtained by multiplying the first counter value by a first weight and a value obtained by multiplying the second counter value by a second weight is greater than a reference value.

8. The USIM management device of claim 1, wherein the USIM usage information includes a third counter value indicating the number of times that an impact of a predetermined magnitude or more is applied to or around the USIM, which is detected by the industrial communication terminal, and (c) includes determining that the USIM is to be replaced if the third counter value is greater than a third reference counter value.

9. The USIM management device of claim 1, wherein a usage time indicating a time period during which the USIM is exposed to a temperature higher or lower than a reference temperature range, which is detected by the industrial communication terminal, and (c) includes determining that the USIM is to be replaced if the usage time exceeds a reference usage time.

10. An industrial communication terminal comprising:

a communication interface;

a storage configured to store USIM usage information; and an operation processor configured to execute (a) transmitting an issue date, which indicates a date on which the USIM is installed, to a predetermined USIM management device through the communication interface, (b) updating the USIM usage information, and (c) transmitting the USIM usage information to the predetermined USIM management device, wherein, (b) includes updating the USIM usage information by detecting at least one among: a first counter value indicating the number of times information is written in or read from the USIM; a second counter value indicating the number of times the industrial communication terminal is powered on and off or the industrial communication terminal is booted; a third counter value indicating the number of times that an impact of a predetermined magnitude or more is applied to or around the USIM; and a usage time indicating a time period during which the USIM is exposed to a temperature higher or lower than a predetermined reference temperature range.

* * * * *